United States Patent
Highfield

(10) Patent No.: US 12,083,673 B2
(45) Date of Patent: Sep. 10, 2024

(54) ROBOTIC ASSEMBLY

(71) Applicant: James Highfield, Mount Brydges (CA)

(72) Inventor: James Highfield, Mount Brydges (CA)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 18/269,317

(22) PCT Filed: Dec. 29, 2021

(86) PCT No.: PCT/CA2021/051898
§ 371 (c)(1),
(2) Date: Jun. 23, 2023

(87) PCT Pub. No.: WO2022/140855
PCT Pub. Date: Jul. 7, 2022

(65) Prior Publication Data
US 2024/0042629 A1 Feb. 8, 2024

Related U.S. Application Data

(60) Provisional application No. 63/131,399, filed on Dec. 29, 2020.

(51) Int. Cl.
*B25J 19/00* (2006.01)
(52) U.S. Cl.
CPC .................. *B25J 19/0029* (2013.01)
(58) Field of Classification Search
CPC .......................... B25J 19/0029; B25J 15/0233
See application file for complete search history.

(56) References Cited

U.S. PATENT DOCUMENTS

| | | | |
|---|---|---|---|
| 2004/0179900 A1 * | 9/2004 | Uematsu ................ | H02G 11/00 405/183.5 |
| 2009/0255711 A1 | 10/2009 | Kwang | |
| 2023/0390948 A1 * | 12/2023 | Hsu ........................... | B25J 9/08 |

FOREIGN PATENT DOCUMENTS

| | | | | |
|---|---|---|---|---|
| FR | 2831090 A1 * | 4/2003 | .......... | B25J 19/0029 |
| WO | WO-2007111468 A1 * | 10/2007 | .......... | B25J 19/0025 |

(Continued)

OTHER PUBLICATIONS

Translation of WO-2023165648-A1, Damerau, Sep. 7, 2023 (Year: 2023).*

(Continued)

*Primary Examiner* — Vinh Luong
(74) *Attorney, Agent, or Firm* — Dickinson Wright PLLC

(57) ABSTRACT

An adapter assembly for a robot arm includes: an inner shaft configured to receive a tool supply cable therethrough and configured to attach to the tool supply cable; an outer member disposed annularly around the inner shaft and attached thereto in a telescopic configuration with the inner shaft movable with the tool supply cable between a retracted position and an extended position; and a compression spring configured to bias the inner shaft to the retracted position. A robotic assembly includes: a robotic arm including at least two linkages configured to articulate relative to each other; a tool attached to the robotic arm; a tool supply cable extending along the robotic arm for providing functionality to the tool; and an adapter assembly connected to the robotic arm. The adapter assembly includes a spring bias toward a retracted position, thereby taking-up slack in the tool supply cable.

20 Claims, 9 Drawing Sheets

(56) References Cited

FOREIGN PATENT DOCUMENTS

| WO | WO-2009127640 A1 | * | 10/2009 | ............... | B23K 9/32 |
| WO | WO-2023165648 A1 | * | 9/2023 | ............... | B25J 19/00 |

OTHER PUBLICATIONS

Translation of WO-2009127640-A1, Binzel, Oct. 22, 2009 (Year: 2009).*

Translation of FR 2831090 A1, Garanchet, Apr. 25, 2003 (Year: 2003).*

* cited by examiner

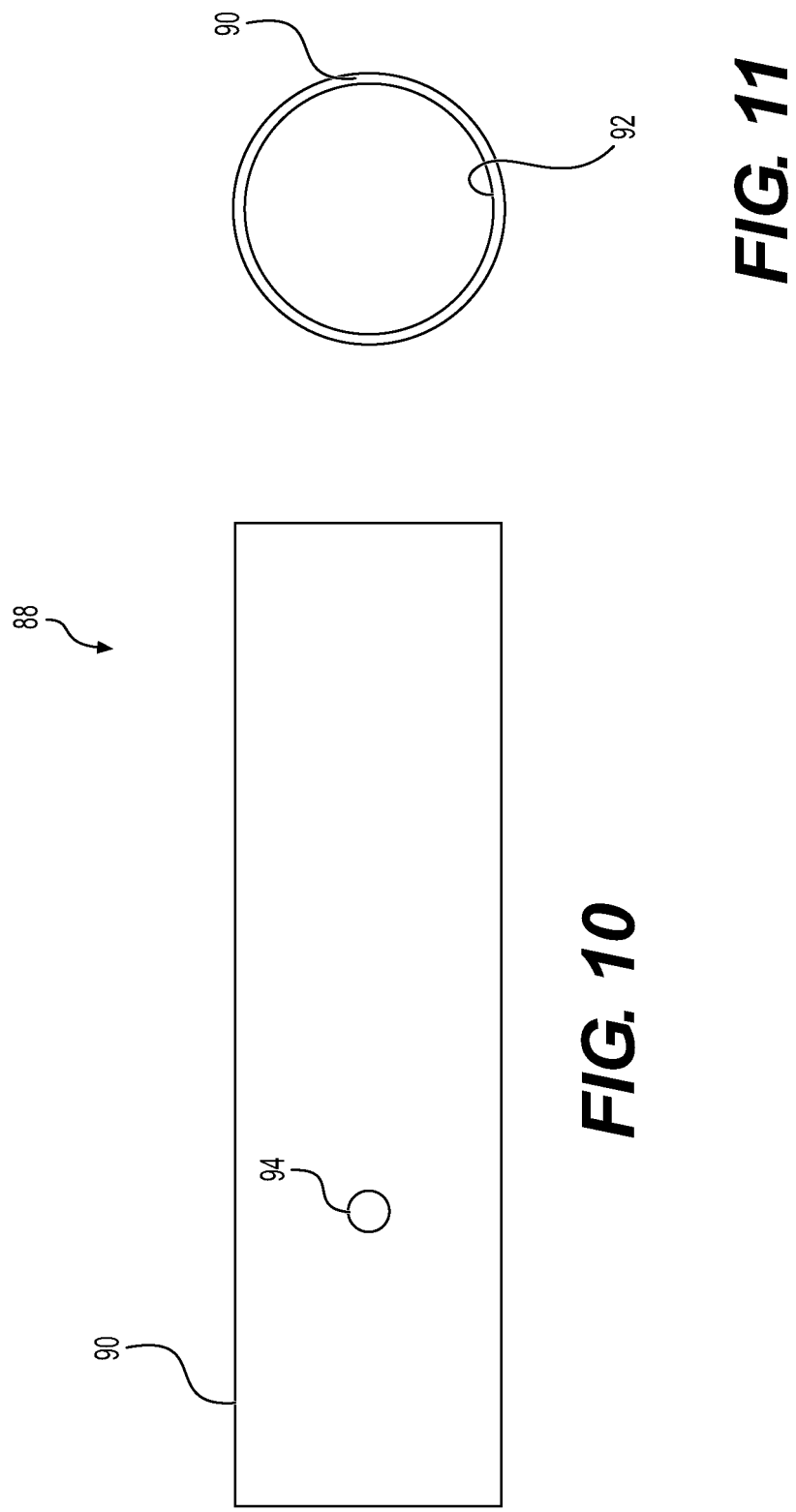

ROBOTIC ASSEMBLY

CROSS-REFERENCE TO RELATED APPLICATIONS

This U.S. National Stage Patent Application claims the benefit of PCT International Patent Application Serial No. PCT/CA2021/051898 filed Dec. 29, 2021 entitled "ROBOTIC ASSEMBLY" which claims the benefit of and priority to U.S. Provisional Patent Application Ser. No. 63/131,399, filed Dec. 29, 2020, titled "Robotic Assembly," the entire disclosures of which are hereby incorporated by reference.

BACKGROUND OF THE INVENTION

1. Field of the Invention

The present invention generally relates to a robotic assembly in a manufacturing environment. More particularly, the present invention relates to a robotic assembly having an arm with an adapter assembly that permits a full range of motion while protecting associated electronic components.

2. Related Art

This section provides background information related to the present disclosure which is not necessarily prior art.

As productivity and efficiency are the goals in any manufacturing environment, robots are being utilized, now more than ever, for a greater number of tasks. The main goal of using robots is productivity that, in theory, will recoup the large initial cost of buying the robots. Many conventional robots include a base and a body that rotates relative to the base and a robotic arm with several articulating joints. These conventional robots are utilized to weld, assemble, and move workpieces between locations. Depending on the task, conventional robots can be programed to execute repeated and preprogramed movements that require articulation around more than one axes. Generally speaking, the more complicated the task, the greater the range of movement requirements are along the various axes. Indeed, associated electronic components, such as cables, must be configured to accommodate the greater range of motion and thus are oftentimes subject to strain during articulation of the various parts. Over time. This repeated straining can degrade the integrity of the associated electronic components and related parts, including solder, wired bonds, cables, welds, and other electronic components.

Accordingly, robot assemblies that can utilize a full range of motion without negatively impacting internal electronics continues of be of interest.

SUMMARY OF THE INVENTION

According to one aspect of the invention, an adapter assembly for a robot arm is provided. The adapter assembly comprises: an inner shaft configured to receive a tool supply cable therethrough and configured to attach to the tool supply cable; an outer member disposed annularly around the inner shaft and attached thereto in a telescopic configuration with the inner shaft movable with the tool supply cable between a retracted position and an extended position; and a compression spring configured to bias the inner shaft to the retracted position According to another aspect, a robotic assembly is provided. The robotic assembly comprises: a robotic arm including at least two linkages, the at least two linkages configured to articulate relative to each other; a tool attached to the robotic arm; a tool supply cable extending along the robotic arm for providing functionality to the tool; and an adapter assembly connected to the robotic arm. The adapter assembly includes: an inner shaft with the tool supply cable extending therethrough and attached thereto, an outer member disposed annularly around the inner shaft and attached thereto in a telescopic configuration with the inner shaft movable with the tool supply cable between a retracted position and an extended position, and a compression spring configured to bias the inner shaft to the retracted position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 10 is a side view of an outer jacket of the adapter assembly;

FIG. 11 is a front view of the outer jacket of the adapter assembly;

DESCRIPTION OF THE ENABLING EMBODIMENT

Example embodiments will now be described more fully with reference to the accompanying drawings. In general, the subject embodiments are directed to a robotic assembly having an arm with an adapter assembly that permits a full range of motion while protecting associated electronic components. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views and charts, the robotic assembly is intended for permitting a full range of motion of a robotic arm while protecting associated electronic components.

Figure 1:
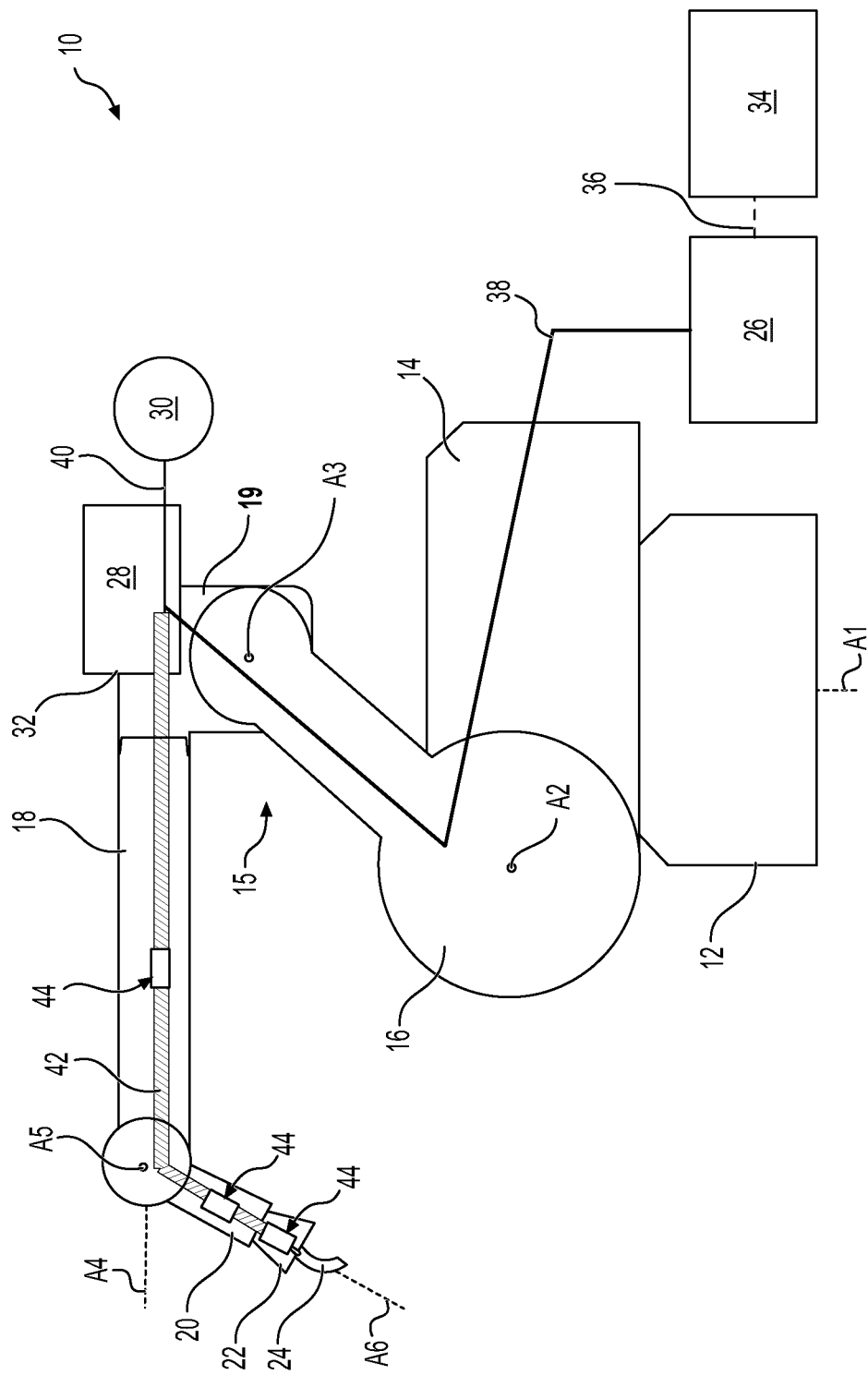
FIG. 1 is a schematic view of a robotic assembly including a series of articulating joints and an adapter assembly.

With Reference initially to FIG. 1, a schematic view of the robotic assembly 10 is provided. The robotic assembly 10 includes a base 12 and a robotic body 14 attached to the base 12. The robotic body 14 rotates relative to the base 12 about a first axis A1. An arm 15 extends from the robotic body 14 and rotates relative to the robotic body 14 about a second axis A2. The arm 15 includes a first linkage 16, a second linkage 18, a second linkage base 19, and a third linkage 20. The first linkage 16 extends from the robotic body 14 to the second linkage base 19. The second linkage 18 extends from the second linkage base 19 to the third linkage 20. The second linkage base 19 rotates relative to the first linkage 16 about a third axis A3, the second linkage 18 rotates relative to the second linkage base 19 about a fourth axis A4, and the third linkage 20 rotates relative to the second linkage 18 about a fifth axis A5. A tool linkage 22 extends from the third linkage 20 and rotates relative to the third linkage 20 about a sixth axis A6. The tool linkage 22 may include at least one tool 24, such as a welding torch.

In some embodiments, the robotic assembly 10 may further include a power source 26 for the welding torch. The power source 26 provides enough power to heat and liquefy a metal material on a workpiece. In some embodiments, a wire feeder device 28 delivers wire to the welding torch from a wire storage container 30. The wire feeder device 28 may connect to the second linkage base 19 via a bracket 32. Operations of the robotic assembly 10 may be controlled via at least one controller 34. The at least one controller 34 may be connected to other components of the robotic assembly 10 via a connection 36 that may be wired or wireless. Power from the power source 26 and/or instructions from the at least one controller 34 may be carried via one or more electrical wires 38 that extend through or otherwise along at least a portion of the arm 15. The one or more electrical wires 38 may include electrical wires for transmitting power and/or control signals to the tool 24. The wire feeder device 28 may distribute welding wire 40 to the welding torch through at least a portion of the arm 15. In some embodiments, the one or more electrical wires 38 and the welding wire 40 may both extend in close proximity along at least a portion of the second linkage 18 and the third linkage 20. A torch whip 42 connects the welding torch to the one or more electrical wires 38 and the welding wire 40.

In operation, the robotic assembly 10 permits the at least one tool 24 to move relative to the workpiece via movement about the plurality of axes A1-A6. As the various components are rotated about the plurality of axes A1-A6, the one or more electrical wires 38 can become strained via repeated pushing and pulling. To negate the pushing and pulling movements of the one or more electrical wires 38, the arm 15 includes at least one adapter assembly 44 that connects to and carries the one or more electrical wires 38 during pushing and pulling movement and minimizes slack near the at least one tool 24. The at least one adapter assembly 44 may be located in the first linkage 16, the second linkage 18, the second linkage bracket 19, and the third linkage 20, the tool linkage 22, the torch whip 42, or a combination thereof. In some embodiments, the at least one adapter assembly 44 is located adjacent the at least one tool 24.

Figure 2:
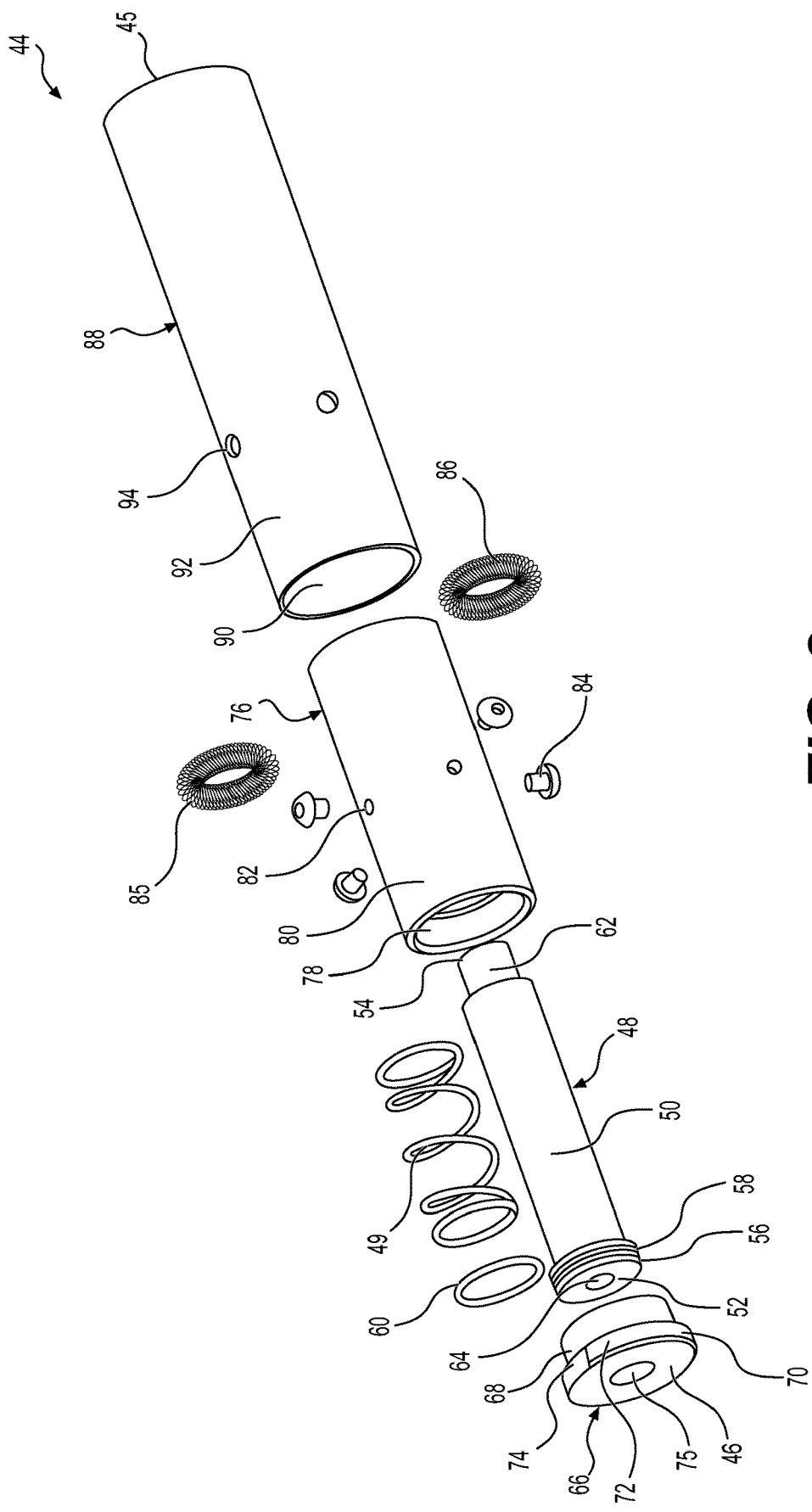
FIG. 2 is a perspective disassembled view of the adapter assembly.

With reference now to FIG. 2, a perspective disassembled view of the adapter assembly 44 is illustrated. The adapter assembly 44 may extend between a front end 45 and a rear end 46, wherein the front end 45 is oriented towards the at least one tool 24, and wherein the rear end 46 is oriented opposite the front end 45. The adapter assembly 44 includes an inner shaft 48 and an outer member 76. In some embodiments, and as shown in FIG. 2, the inner shaft 48 has a tubular shape with a round exterior shape and a round interior bore coaxial therewith. However, the inner shaft 48 could be configured with a different shape, such as a C-channel with a C-shaped cross-section or a square tube with a square shaped cross-section. In some embodiments, outer member 76 has tubular shape with a round exterior shape and a round interior bore coaxial therewith, although the outer member 76 may have a different shape. The inner shaft 48 is disposed, at least partially, within the outer member 76 and slidably movable relative thereto in a telescopic configuration. The inner shaft 48 is attached to the one or more electrical wires 38, the welding wire 40 or combinations thereof hereafter referred to as tool supply cable 38,40. In some embodiments, the tool supply cable 38,40 may include other types of supply conduits, such as gas or liquid conduits, depending on the type and function of the tool 20.

The adapter assembly 44 further includes an inner shaft 48 that travels with the compression spring 49. The inner shaft 48 includes a shaft body 50, which may extend along at least one of the axes A1-A6. The shaft body 50 extends between proximal end 52 and a distal end 54. The proximal end 52 includes an annular flange 56 that defines a groove 58 for holding a seal 60, such as an O-ring. The distal end 54 includes an inward tapered portion 62 having a smaller diameter than the shaft body 50. The inward tapered portion 62 may connect to the tool supply cable 38,40 for holding the tool supply cable 38,40 at the distal end 54. However, the tool supply cable 38,40 may be held or secured to the inner shaft 48 at a different location and/or at multiple locations. The shaft body 50 defines an opening 64 and the tool supply cable 38,40 extends therethrough. For example, and as shown in FIG. 2, the inner shaft 48 may have a generally tubular shape, with a central bore defining the opening for the tool supply cable 38,40 to pass through.

The adapter assembly 44 also includes a compression spring 49 in the form of a coil spring which is disposed around the inner shaft 48 and within an outer member 76. During operation, the compression spring 49 compresses and expands under articulation of the components of the robotic assembly 10 between the axes A1-A6. Thus, as the articulated positioning requires a greater length of the tool supply cable 38,40, the tool supply cable 38,40 may pull the inner shaft 48 away from the rear end 46 and toward an extended position. As the articulated positioning requires a reduced length, the compression spring 49 carries the tool supply cable 38,40 back with a biasing force. In other words, the compression spring 49 biases the inner shaft 48 toward a retracted position, away from the front end 45 and away from the at least one tool 24, thereby taking-up any slack in the tool supply cable 38,40 between the at least one tool 24 and the adapter assembly 44.

A cap 66 may enclose an end of the outer member 76 proximate to the proximal end 52 of the inner shaft 48. The proximal end 52 of the inner shaft 48 may contact the cap 66 when the inner shaft 48 is in a retracted position. The cap 66 may include a cap body 68 having a cylindrical and tubular shape and a gripping portion 70 having a generally cylindrical and tubular shape located adjacent to the cap body 68 and coaxial therewith and having a larger outside diameter than the cap body 68. The gripping portion 70 may include an outward surface 72 for connecting to a portion of the robotic arm 15. The outward surface 72 may be rounded and define at least one interface portion 74. In some embodiments, the at least one interface portion 74 may be flat. The cap 66 may further define a cap opening 75 extending through the cap body 68 for accommodating the tool supply cable 38,40. The cap 66 may be located adjacent to and/or connected to the at least one tool 24 e.g., a welding torch.

The adapter assembly 44 may further include an outer member 76 extending between a forward end and rear end, wherein the forward end is oriented towards the at least one tool 24, and wherein the rear end is oriented opposite the forward end. The outer member 76 includes an inner bore 78 defining an opening for holding the inner shaft 48 and other components. The outer member 76 further includes an outer surface 80 with a series of first apertures 82 extending from the outer surface 80 towards the inner bore 78 for holding at least one fastener 84. A first electro-spring 85 and a second electro-spring 86 are located in the opening defined by the inner bore 78. The electro-springs 85, 86 may provide a constant force across the working surface within a deflection range thereof. The force remains constant as the adapter assembly 44 is extended or retracted. As such, the electro-springs 85, 86 compensate for any misalignments, mating surface irregularities and side load stress. The continual contact provides a good electrical continuity for current to flow between the outer member 76 and the inner shaft 48. The electro-springs 85, 86 may include a helical spring formed into a torus or a donut-shape, as shown in FIG. 2. However, either or both of the electro-springs 85, 86 may have a different shape or configuration. The electro-springs 85, 86 may be formed of a conductive material, such as a metal.

The adapter assembly 44 may further include an outer jacket 88 extending between a forward end and rear end, wherein the forward end is oriented towards the at least one tool 24, and wherein the rear end is oriented opposite the forward end. The outer jacket 88 has a tubular shape including an outer surface 80 and an inner wall 90 defining an opening for holding the outer member 76 and other components. The outer jacket 88 defines a series of second apertures 94, corresponding to first apertures 82, and extending from the outer surface 80 to the inner wall 90 for holding the at least one fastener 84. That is, the second apertures 94 in the outer jacket 88 are aligned with corresponding first apertures 82 in the outer member 76 when the adapter assembly 44 is assembled, for receiving the fasteners 84 through each of the second apertures 94 in the outer jacket 88 and corresponding ones of the first apertures 82 in the outer member 76 for securing the outer member 76 within the outer jacket 88.

Figure 3A:
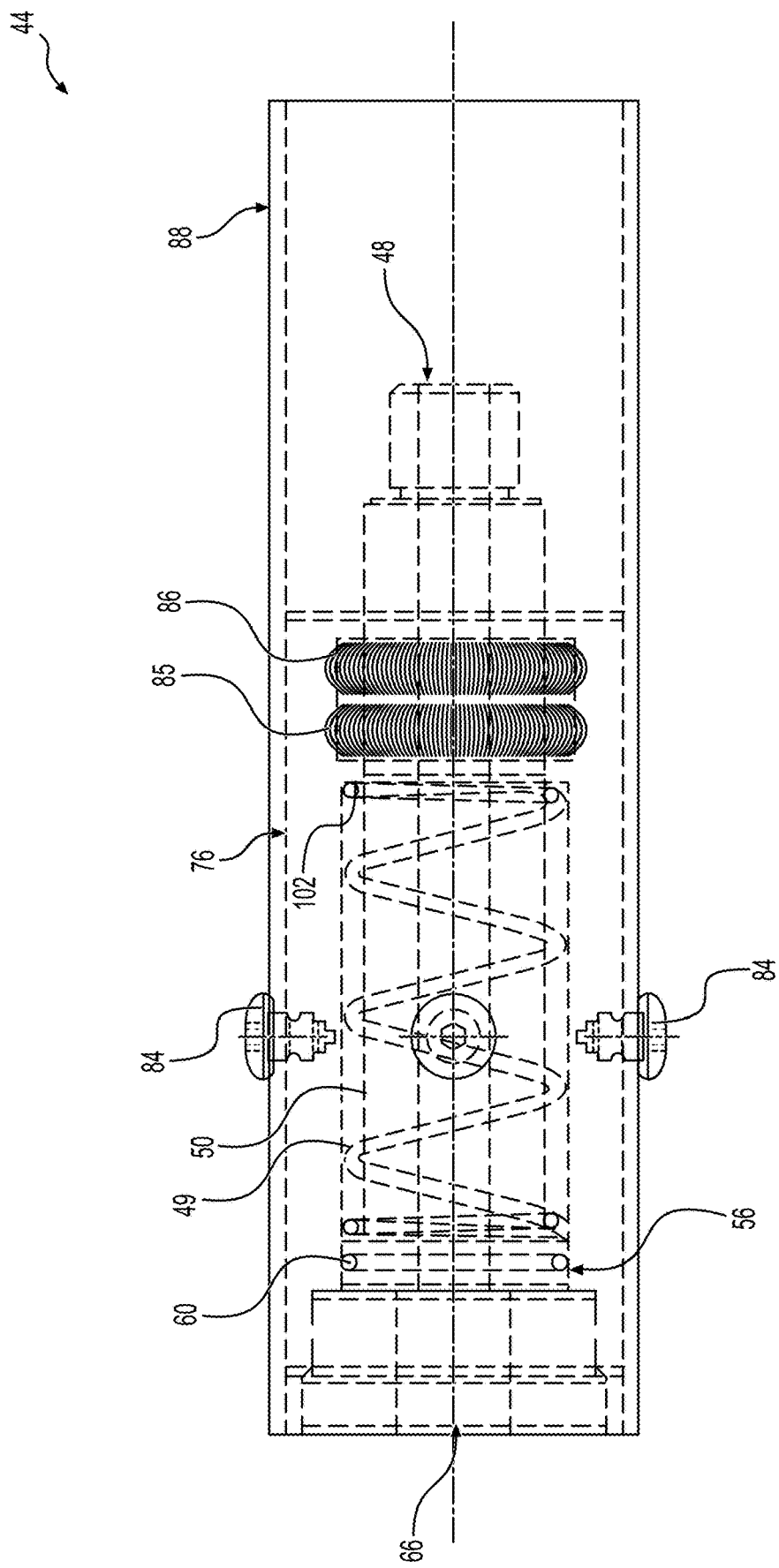
FIG. 3A is an interior side view of the adapter assembly in a retracted position.
Figure 3B:
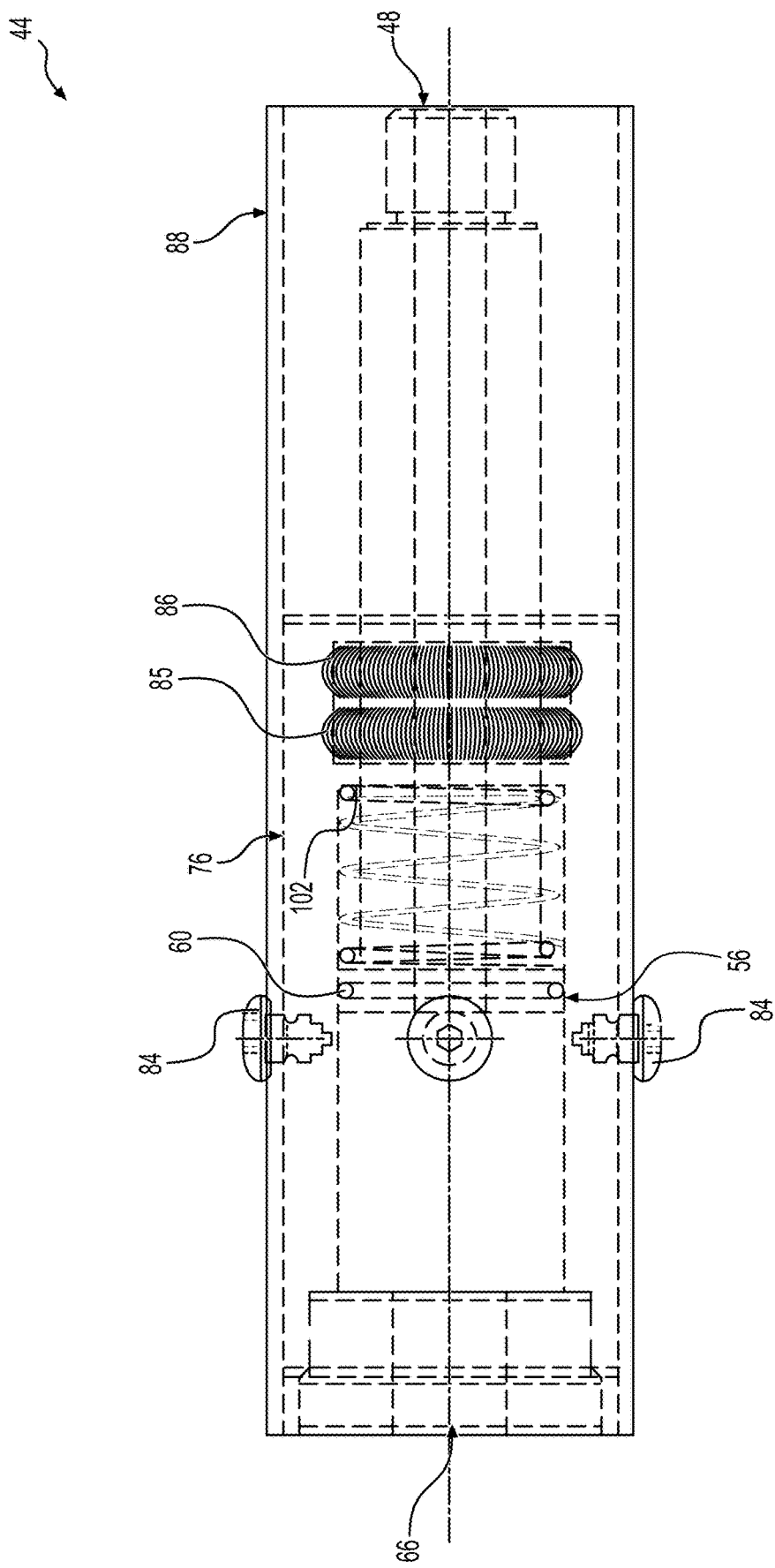
FIG. 3B is an interior side view of the adapter assembly in an extended position.

FIGS. 3A-3B each show an interior side view of the adapter assembly 44 in an assembled condition. When assembled, the outer member 76 houses the inner shaft 48, the seal 60, the electro-springs 85, 86, and the compression spring 49, wherein the compression spring 49 and the electro-springs 85, 86 are disposed about the inner shaft 48 and the seal 60 seals between the inner shaft 48 and the cap 66. In some embodiments, the cap body 68 seals against the inner wall of the outer jacket 88 or the inner bore 78 of the outer member 76. The outer jacket 88 houses the outer member 76 and connects thereto with the at least one fastener 84. The outer jacket 88 further houses the cap 66. In some embodiments, the cap 66 is located in a flush location with an outer circumference of the forward end of the outer jacket 88. In some embodiments, the outer jacket 88 statically connects to a location within the robotic arm 15 and to the outer member 76. The inner shaft 48 holds the tool supply cable 38,40 and travels with the compression spring 49 during articulation of the components (e.g., linkages) of the robotic assembly 10 between the axes A1-A6.

Figure 5:
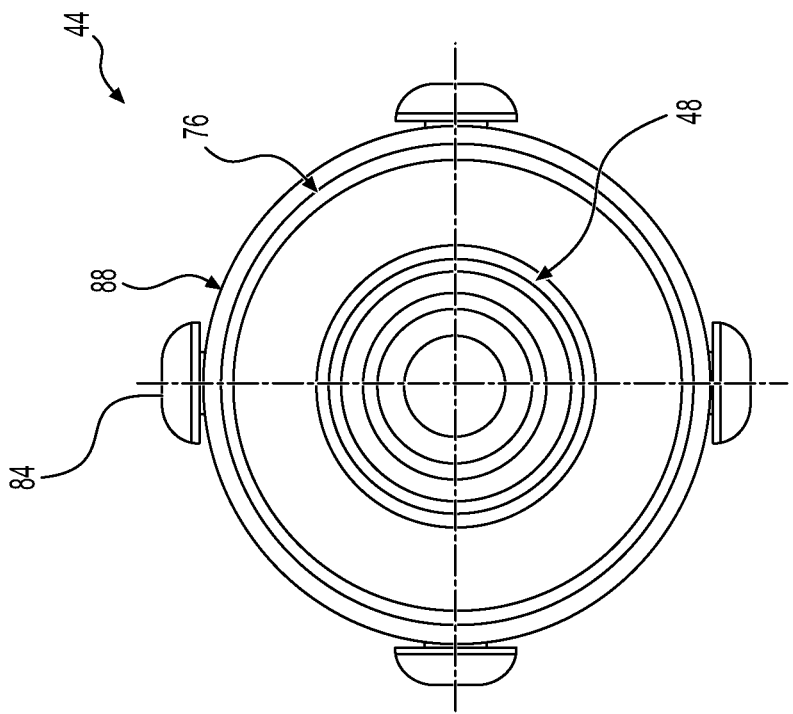
FIG. 5 is a rear view of the adapter assembly.
Figure 4:
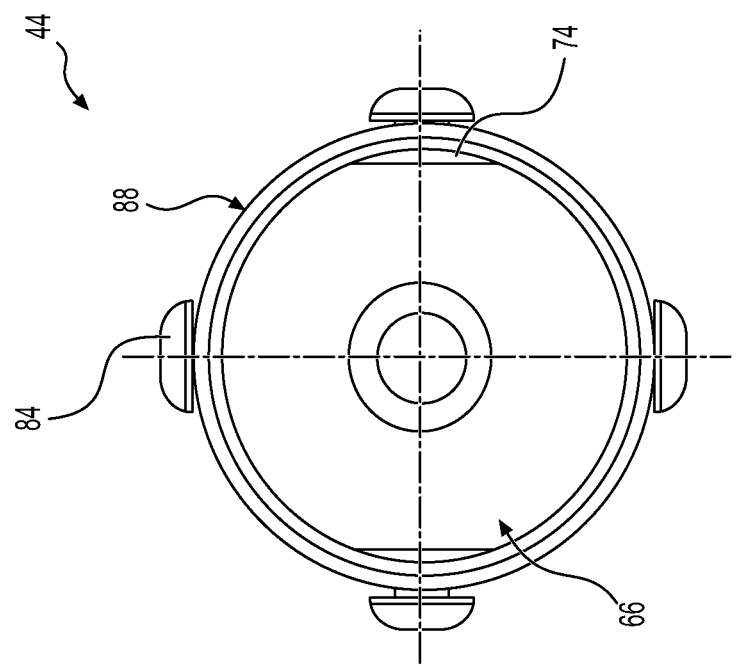
FIG. 4 is a front view of the adapter assembly.

FIG. 4 is a front view of the adapter assembly 44 illustrating the front end. The cap 66 is disposed in the outer jacket 88. The gripping portion 70 of the cap 66 is sized to fit within the outer jacket 88 with minimal clearance. As such, the at least one interface portion 74 may be accessed even when the adapter assembly 44 is in the assembled condition for removing and attaching the cap 66. FIG. 5 is a rear view of the adapter assembly 44 illustrating the rear end. The tapered portion 63 of the inner shaft 48 is shown disposed centrally within the outer member 76 and the outer jacket 88 and the opening 64 is matched with the cap opening 75 such that the tool supply cable 38,40 can extend entirely through the adapter assembly 44.

Figure 6:
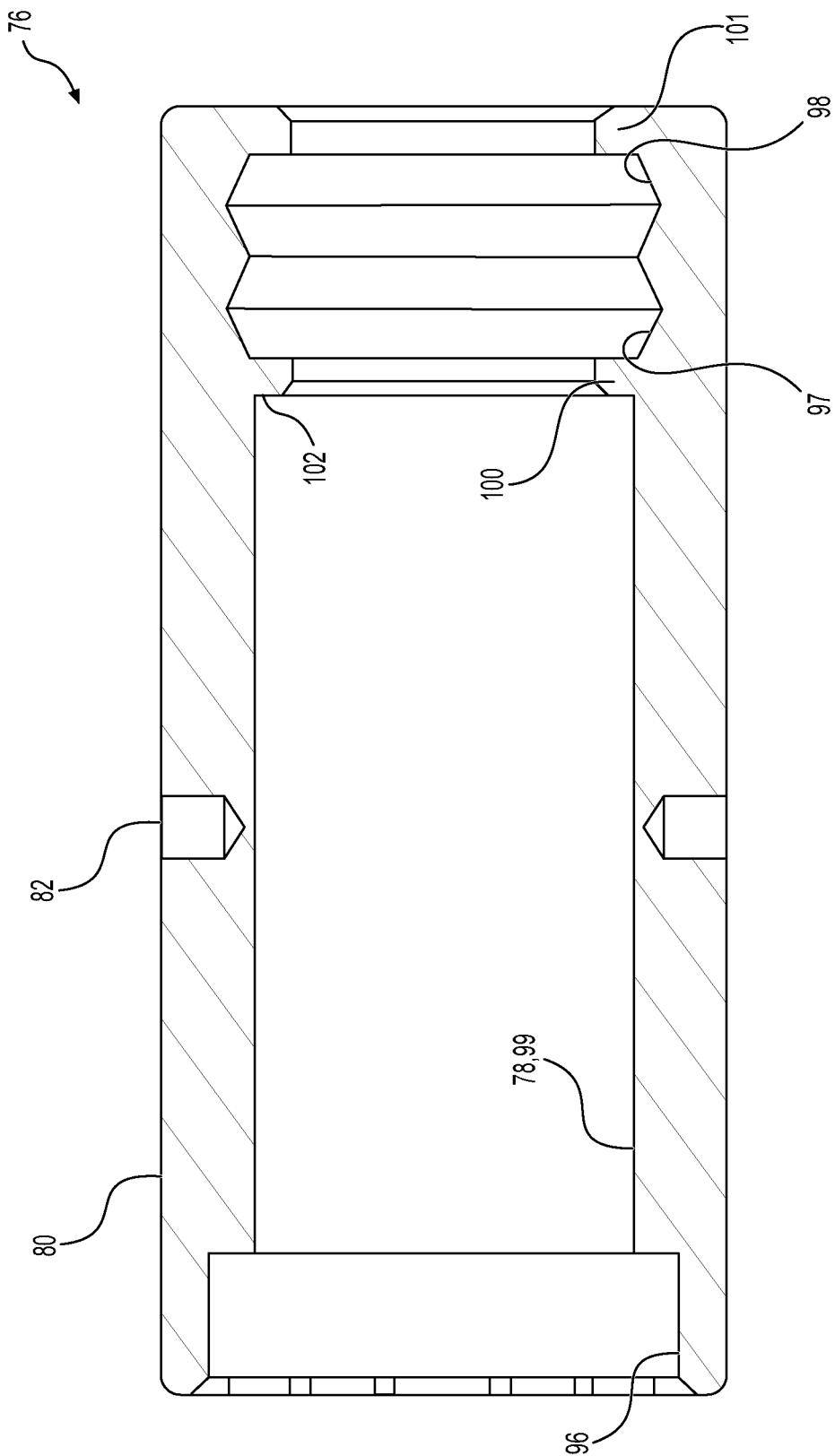
FIG. 6 is a cross-sectional side view of an outer member of the adapter assembly.

FIG. 6 is a cross-sectional side view of the outer member 76. The inner bore 78 defines a series of surfaces for axially retaining various components of the adapter assembly 44. From the front end and moving towards the rear end, the inner bore 78 defines an annular cap groove 96 for housing the cap body 68. In some embodiments, the gripping portion 70 may be sized equally with the outer surface 80 of the outer member 76 such that it sits flush when the cap body 68 is inserted into the annular cap groove 96. The boundary on the front end between the outer surface 80 and the inner bore 78 defines a taper for facilitating insertion of the cap 66. The inner bore 78 of the outer member 76 further includes a first annular spring groove 97 configured to receive and retain the first electro-spring 85, and a second annular spring groove 98 configured to receive and retain the second electro-spring 86. Alternatively, the inner bore 78 of the outer member 76 may include only one of the annular spring grooves 97, 98 for receiving and retaining a single one of the electro-springs 85, 86.

The inner bore 79 of the outer member 76 defines a cylindrical wall 99 extending between the annular spring grooves 97, 98 and the annular cap groove 96. The cylindrical wall 99 is configured to receive the annular flange 56 of the inner shaft 48 for guiding the inner shaft 48 axially through the outer member 76 between a retracted position and an extended position. The seal 60 may engage the cylindrical wall 99 annularly and provide some cushion therebetween. The inner bore 78 of the outer member 76 defines a first annular projection 100 located adjacent to one of the annular spring grooves 97, 98 and between the annular spring grooves 97, 98 and the cylindrical wall 99. The first annular projection 100 defines a side face 102 having an annular shape adjacent to and perpendicular to the cylindrical wall and facing toward the annular cap groove 96. The inner bore 78 of the outer member 76 also defines second annular projection 101 on an opposite side of the annular spring grooves 97, 98 from the first annular projection 100. The annular projections 100, 101 may together function to axially retain the electro-springs 85, 86.

Referring back to FIGS. 3A-3B, the coil spring 49 extends between the annular flange 56 of the inner shaft 48 and the side face 102 for biasing the inner shaft 48 away from the side face 102 and toward the retracted position, with the annular flange 56 of the inner shaft 48 adjacent to the cap 66.

Figure 9:
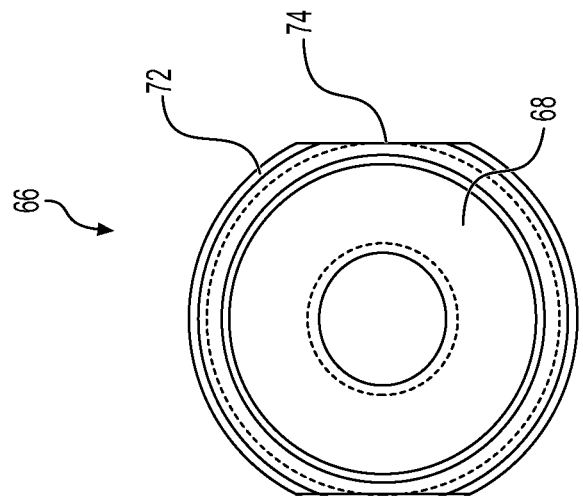
FIG. 9 is a rear view of the cap of the adapter assembly.
Figure 8:
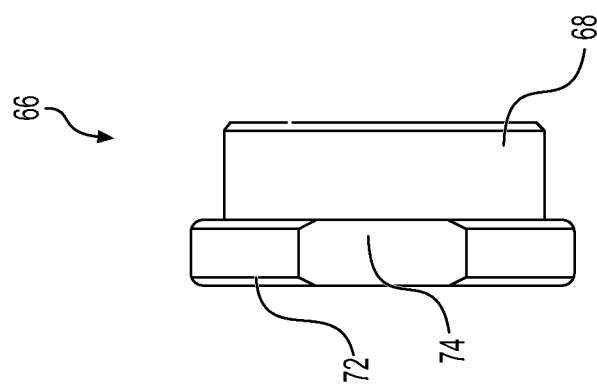
FIG. 8 is a side view of the cap of the adapter assembly.
Figure 7:
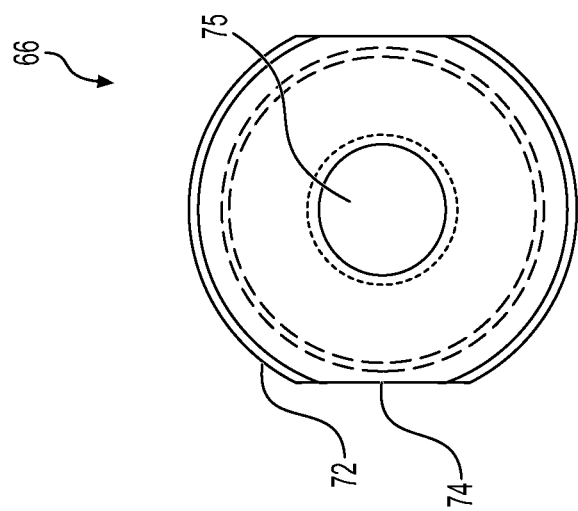
FIG. 7 is a front view of a cap of the adapter assembly.

FIG. 7 is a front view of the cap 66 of the adapter assembly 44. The interface portions 74 are illustrated as being on diametrically opposite ends of the gripping portion 70, which is round. FIG. 8 is a side view of the cap 66, showing the body 68 having a tapered end for facilitating insertion into the annular cap groove 96. FIG. 9 is a rear view of the cap 66. In some embodiments, the outward surface 72 of the gripping portion 70 may have a thickness substantially equal to the distance between the outer surface 80 and the inner bore 78 of the outer member 76 at the annular cap groove 96.

FIG. 10 is a side view of an outer jacket 88, wherein the outer jacket 88 includes a tubular shape. FIG. 11 is a front view of the outer jacket 88 illustrating the second apertures 94, wherein the second apertures 94 includes two pair of diametrically opposed second apertures 94. In some embodiments, the second apertures 94 may be distributed at regular intervals around a circumference of the outer jacket 88. In some embodiments, the second apertures 94 may be distributed at non-regular intervals around the circumference of the outer jacket 88.

Figure 13A:
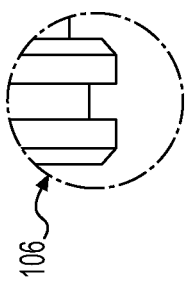
FIG. 13A shows an enlarged portion of FIG. 13.
Figure 14:
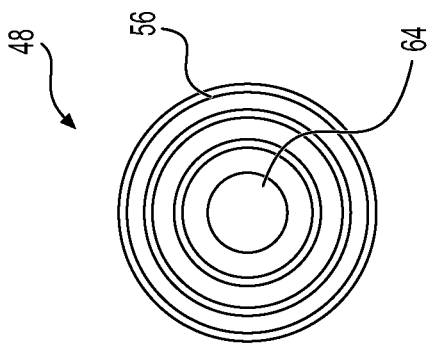
FIG. 14 is a rear view of the inner shaft of the adapter assembly.
Figure 12:
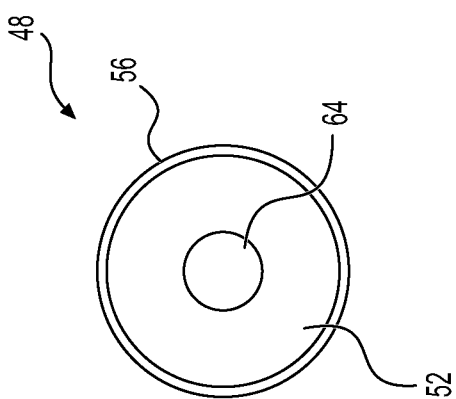
FIG. 12 is a front view of an inner shaft of the adapter assembly.
Figure 13:
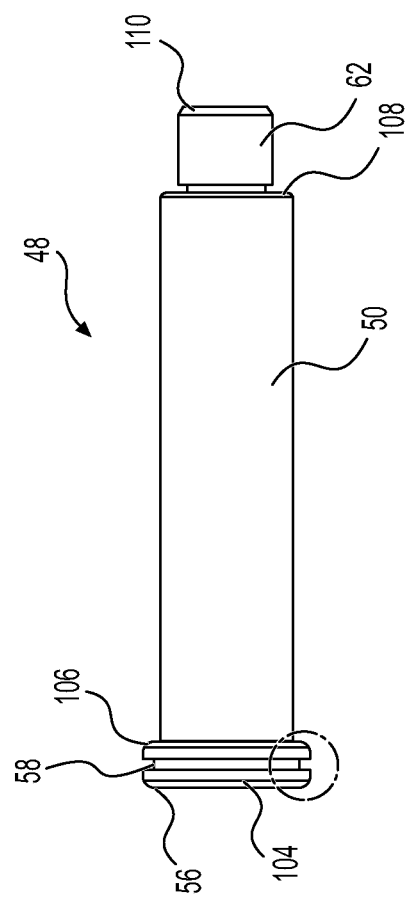
FIG. 13 is a side view of the inner shaft of the adapter assembly.

FIG. 12 is a front view of the inner shaft 48. The inner shaft 48 is generally cylindrically-shaped and the front end includes a tapered outer edge 104. FIG. 13 is a side view of the inner shaft 48, and FIG. 13A shows an enlarged portion of FIG. 13. The annular flange 56 may further include a tapered outer edge 106 on the rear end. The inner shaft 48 may further include a groove 108 extending radially inwardly and located between the body 50 and the tapered portion 62. The rear end of the tapered portion 62 may further include a tapered outer edge 110. FIG. 14 is a rear view of the inner shaft 48 illustrating a series of circumferential outer edges of the tapered portion 62, the body 50, and the annular flange 56.

An adapter assembly for a robot arm comprises: an inner shaft configured to receive a tool supply cable therethrough and configured to attach to the tool supply cable; an outer member disposed annularly around the inner shaft and attached thereto in a telescopic configuration with the inner shaft movable with the tool supply cable between a retracted position and an extended position; and a compression spring configured to bias the inner shaft to the retracted position.

In some embodiments, the compression spring includes a coil spring disposed annularly around the inner shaft. In some embodiments, the inner shaft has a tubular shape.

In some embodiments, the adapter assembly further comprises an outer jacket attached to the outer member and having a tubular shape disposed around the outer member. In some embodiments, the adapter assembly further comprises at least one electro-spring of electrically conductive material disposed between the outer member and the inner shaft and providing electrical continuity therebetween. In some embodiments, the at least one electro-spring includes two or more electro-springs. In some embodiments, the adapter assembly further comprises a cap configured to enclose an axial end of the outer member.

A robotic assembly comprises: a robotic arm including at least two linkages, the at least two linkages configured to articulate relative to each other; a tool attached to the robotic arm; a tool supply cable extending along the robotic arm for providing functionality to the tool; and an adapter assembly connected to the robotic arm. The adapter assembly includes: an inner shaft with the tool supply cable extending therethrough and attached thereto, an outer member disposed annularly around the inner shaft and attached thereto in a telescopic configuration with the inner shaft movable with the tool supply cable between a retracted position and an extended position, and a compression spring configured to bias the inner shaft to the retracted position.

In some embodiments, the compression spring includes a coil spring disposed annularly around the inner shaft. In some embodiments, the robotic assembly further comprises an outer jacket attached to the outer member and having a tubular shape disposed around the outer member.

In some embodiments, the robotic assembly further comprises at least one electro-spring of electrically conductive material disposed between the outer member and the inner shaft and providing electrical continuity therebetween. In some embodiments, the at least one electro-spring includes two or more electro-springs.

In some embodiments, the tool supply cable includes an electrical wire for providing one of power or a control signal to the tool.

In some embodiments, the tool includes a welder and the tool supply cable includes a welding wire for feeding the welder.

In some embodiments, the tool supply cable includes a fluid conduit for supplying a fluid to the tool.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adapter assembly for a robot arm, comprising:
an inner shaft configured to receive a tool supply cable therethrough and configured to attach to the tool supply cable;
an outer member disposed annularly around the inner shaft and attached thereto in a telescopic configuration with the inner shaft movable with the tool supply cable between a retracted position and an extended position;
a compression spring configured to bias the inner shaft to the retracted position; and
at least one electro-spring of electrically conductive material disposed between the outer member and the inner shaft and providing electrical continuity therebetween.

2. The adapter assembly of claim 1, wherein the compression spring includes a coil spring disposed annularly around the inner shaft.

3. The adapter assembly of claim 1, wherein the inner shaft has a tubular shape.

4. The adapter assembly of claim 1, further comprising an outer jacket attached to the outer member and having a tubular shape disposed around the outer member.

5. The adapter assembly of claim 1, wherein the at least one electro-spring includes two or more electro-springs.

6. The adapter assembly of claim 5, wherein the two or more electro-springs includes two of the electro-springs disposed adjacent to one-another and each disposed on a same side of the compression spring.

7. The adapter assembly of claim 1, further comprising a cap configured to enclose an axial end of the outer member.

8. The adapter assembly of claim 1, wherein the at least one electro-spring is configured to provide a force between the outer member and the inner shaft, wherein the force is substantially constant as the adapter assembly is extended or retracted.

9. The adapter assembly of claim 1, wherein the at least one electro-spring includes a helical spring.

10. The adapter assembly of claim 1, wherein the at least one electro-spring includes a spring that is formed into a torus.

11. The adapter assembly of claim 1, wherein the at least one electro-spring is spaced apart from the compression spring in an axial direction.

12. The adapter assembly of claim 1, wherein the outer member defines a generally tubular shape having an inner bore that defines an annular groove configured to receive the at least one electro-spring.

13. The adapter assembly of claim 12, wherein the compression spring includes a coil spring disposed annularly around the inner shaft; and
wherein the outer member includes an annular projection disposed adjacent to the annular groove, the annular projection defining a side face opposite the annular groove and configured to engage the coil spring.

14. A robotic assembly comprising:
a robotic arm including at least two linkages, the at least two linkages configured to articulate relative to each other;
a tool attached to the robotic arm;
a tool supply cable extending along the robotic arm for providing functionality to the tool; and
an adapter assembly connected to the robotic arm, the adapter assembly including: an inner shaft with the tool supply cable extending therethrough and attached thereto, an outer member disposed annularly around the inner shaft and attached thereto in a telescopic configuration with the inner shaft movable with the tool supply cable between a retracted position and an extended position, and a compression spring configured to bias the inner shaft to the retracted position, and at least one electro-spring of electrically conductive material disposed between the outer member and the inner shaft and providing electrical continuity therebetween.

15. The robotic assembly of claim 14, wherein the compression spring includes a coil spring disposed annularly around the inner shaft.

16. The robotic assembly of claim 14, further comprising an outer jacket attached to the outer member and having a tubular shape disposed around the outer member.

17. The robotic assembly of claim 14, wherein the at least one electro-spring includes two or more electro-springs.

18. The robotic assembly of claim 14, wherein the tool supply cable includes an electrical wire for providing one of power or a control signal to the tool.

19. The robotic assembly of claim 14, wherein the tool includes a welder and the tool supply cable includes a welding wire for feeding the welder.

20. The robotic assembly of claim 14, wherein the tool supply cable includes a fluid conduit for supplying a fluid to the tool.

* * * * *